March 23, 1943. K. J. JACKSON 2,314,704
PINEAPPLE GRADING APPARATUS
Original Filed Jan. 3, 1940 2 Sheets-Sheet 1
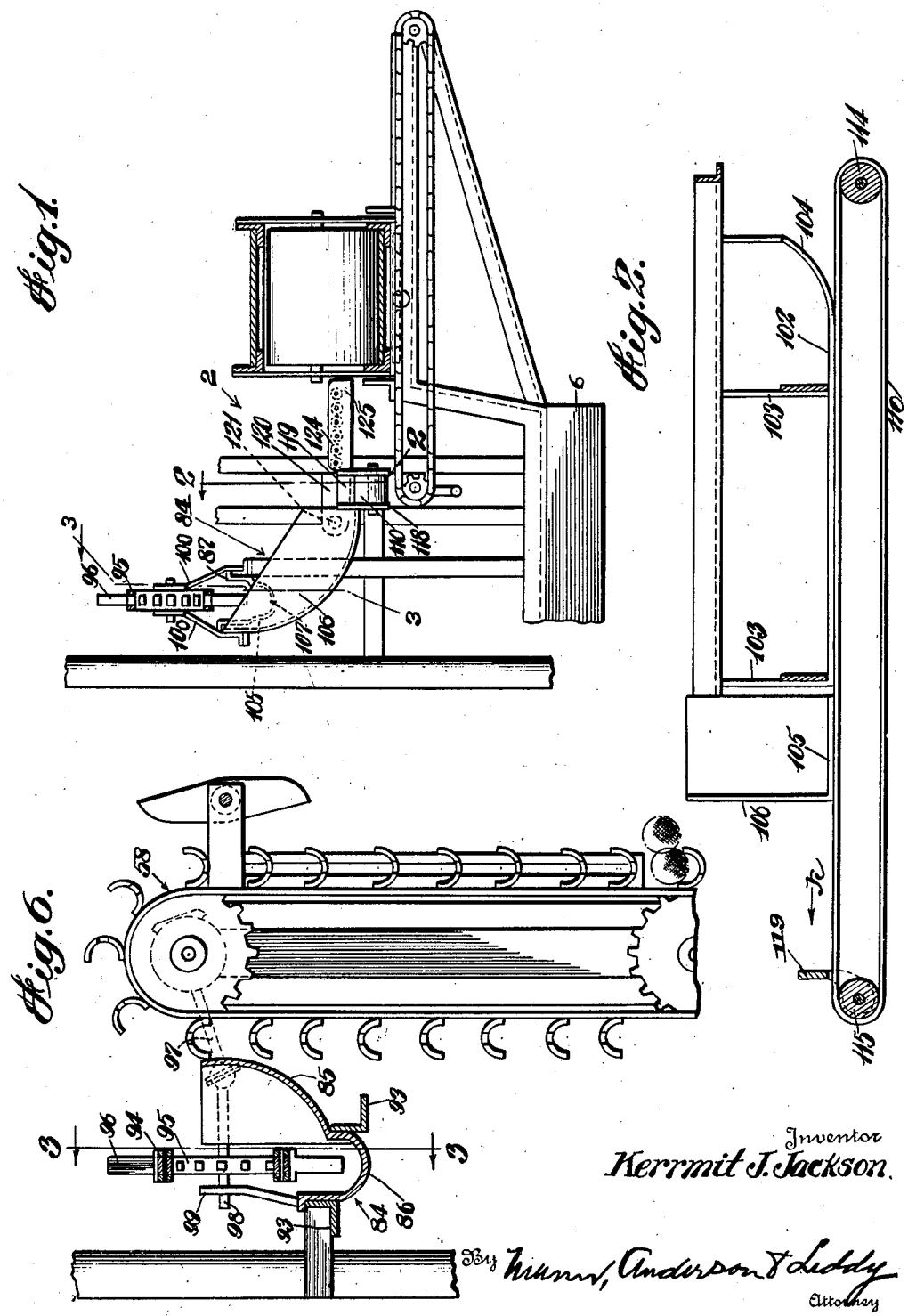
Inventor
Kerrmit J. Jackson
By Munn, Anderson & Leddy
Attorney March 23, 1943. K. J. JACKSON 2,314,704
PINEAPPLE GRADING APPARATUS
Original Filed Jan. 3, 1940 2 Sheets-Sheet 2
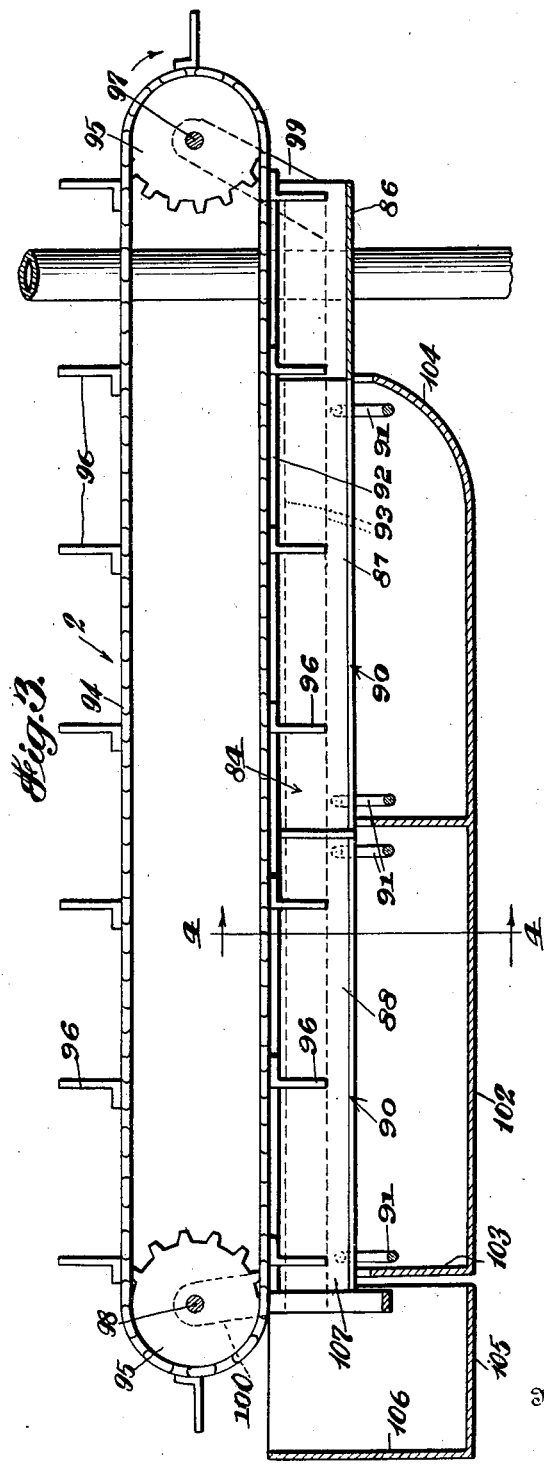
Inventor
Kermit J. Jackson.
By Mann, Anderson & Liddy
Attorney Patented Mar. 23, 1943

2,314,704

UNITED STATES PATENT OFFICE 2,314,704

PINEAPPLE GRADING APPARATUS

Kermit J. Jackson, Honolulu, Territory of Hawaii

Original application January 3, 1940, Serial No. 312,276. Divided and this application November 5, 1940, Serial No. 364,452

2 Claims. (Cl. 209—99)

This invention relates to improvements in harvesting machinery, but more particularly in an apparatus for grading pineapples. Although the apparatus is not necessarily confined to this specific use, yet it is well adapted thereto, and in fact is part of a certain pineapple harvester disclosed in an application for patent filed by Kermit J. Jackson January 3, 1940, Serial No. 312,276, of which application the instant application is a division.

In the pineapple harvester aforesaid use is made of a contrivance which is transported across a field of growing pineapple plants and longitudinally of the rows thereof, for the purpose of receiving the pines as they are cut from the plants by workmen who walk the lanes between the rows. The root or butt and foliage ends of the successive pineapples are trimmed off by means not necessarily disclosed in the instant application, whereupon the trimmed stock is delivered to the grading apparatus which provides for an assortment as to size. With this preamble in mind the objects of the invention are as follows:

First, to provide an apparatus for grading pineapples or the like which includes a succession of specially made troughs through variously sized slots of which the trimmed pineapple stock drops according to size.

Second, to provide for the sorting or grading of the trimmed fruit preparatory to packing it into regulation pineapple boxes by men stationed at proper intervals along what is known as a packing conveyor.

Other objects and advantages will appear in the following specification, reference being had to the accompanying drawings, in which:

Figure 1 is a partially elevational and sectional view of a portion of a pineapple harvester, particularly illustrating certain elements of the instant grader.

Figure 2 is a partially sectional and elevational view as seen substantially on the line 2—2 of Fig. 1.

Figure 3 is a vertical section taken on the line 3—3 of Fig. 1.

Figure 4 is a cross section taken on the line 4—4 of Fig. 3.

Figure 5 is a perspective view of one of the detachable grader troughs.

Figure 6 is a detail sectional view illustrating the association of the grader with the fruit elevator of the pineapple harvester.

In carrying out the invention the pineapple harvester 2 of which the instant grading apparatus is a part, is adapted to be transported across a field of growing plants and longitudinally of the rows thereof, to receive the pines as cut by the workmen in the general manner briefly described above and as pointed out in particular in the application of which this is a division.

The grading apparatus is mounted on a base 6 (Fig. 1) which in practice is suitably wheeled so as to run on the ground. Suitable framing is employed for the support of the grader generally designated 84. It is by way of a curved chute 85 (Fig. 6) that the trimmed pineapples are delivered from the fruit elevator 58 to a fixed trough section 86 (Figs. 3 and 6) of the instant grader. This section heads a plurality of detachable troughs 87, 88. These troughs are also known as detachable graders. Two of them are shown, but the number can be varied to meet the needs of any particular apparatus.

Fig. 5 illustrates one of these troughs or graders. The trough 87 is chosen for example. It consists of a pair of sides 89 which are spaced to define a slot 90 from end to end of the trough. The spacing is established by yokes 91. The ends of these yokes are secured to the sides 89 in any desired way, and said yokes extend down far enough not to interfere with the progress of the pineapple.

The slot 90 of trough 87 is narrower than the slot in the trough 88. Consequently the small pineapples will fall through the plot in trough 87 first. The slot 90 of the trough 88 is for the larger pineapples. The sides 89 (Fig. 5) are flanged at 92. The flanges of the troughs are rested upon the top edges of rigidly mounted angle irons 93 (Fig. 6) which comprise parts of the grader 84. It is between these angle irons that the trough 86 is fixed at the head of the grader. Inasmuch as the troughs 87, 88 are separate from each other and are merely rested upon the angle irons 93, it follows that said troughs can be detached from the grader and substituted by others having a different slot spacing.

A drive chain 94 (Fig. 3) operates above the grader 84. The sprockets 95 which carry it are mounted at such an altitude that the lower run of the chain 94 traverses the top plane of the grader 84, or substantially so. This chain carries paddles 96 which, when traversing the grader 84 because of said relationship of the lower chain flight, push the pineapples from the fixed trough 86 along the other troughs 87, 88 until they fall through one or the other of the slots 90.

The sprockets 95 are carried by shafts 97, 98. Said shafts are journaled in brackets 99, 100, which extend up from parts of the framing. Driving power for the chain 94 (Fig. 3) is derived from a transmission, the details of which are not essential herein. As the graded pineapples fall through the slots 90 (Fig. 4) they enter a curved chute 102 which is partitioned at 103 (Fig. 3) to so sub-divide the chute that there will be a section for each one of the detachable graders. The head end of the chute 102 has a rounded terminal 104 which prevents any inadvertent backing off of the pineapples. The rounding causes the pineapples to roll forwardly. The chute 105 at the end of the chute 102 has a wall 106 to retain the last and largest pineapples.

At this point it is observed in Fig. 3 that the chute extremity 105 extends beyond the adjacent terminal 107 of the grader trough. Said terminal is open. Pineapples sufficiently large to avoid falling through the slot 90 of the last trough 88 are discharged at the open terminal 107 into the extremity 105.

The chute 102 curves down and eventually merges into a belt trough 108 (Fig. 4). This trough is flanged at 109 to insure the retention and guidance of the top flight of a conveyor belt 110. This belt is intended to receive pineapples as they roll down the chute 102 and then convey them forwardly (arrow k, Fig. 2) past a number of prearranged workmen's stations. This belt is carried by a pair of pulleys 114, 115 (Fig. 2) to one of which driving power is suitably applied.

A fence 119 (Fig. 2) is intended to prevent the inadvertent passage of a pineapple beyond the forward extremity of the conveyor belt 110. The partitions 103 (Fig. 3) have extensions 120 (Fig. 4) across the belt trough 108 serving the purpose of stops for the pineapples of the various grades. Each extension or stop is pivoted at 121 to the respective partition 103. The normal position of each stop is down, thereby to confine the various pineapples to those portions of the chute 102 devoted to the prearranged sizes. If it should be chosen to let some of the pineapples pass down to the next grade, the stop 120 may be raised to the dotted line position (Fig. 4), thus to remove the obstruction from across the belt 110.

Each of the previously mentioned workmen's stations is distinguished by having a roller table at one side. Only one of these roller tables is shown herein, being designated 124 (Fig. 1). Said roller table 124, using this one as an example, comprises sides 125 (Fig. 1) supported at their ends by the belt trough 108 (Fig. 4) and by any suitable bracing which may extend down to the base 6. The roller tables divide the various workmen's stations, and as empty boxes previously emplaced on these tables are filled they are rolled off onto a packing conveyor, the rollers of said tables facilitating the necessary manual effort in making the change-over.

The operation is readily understood. The grader 84 (Fig. 6) begins at an appropriately designated point in the pineapple harvester, which, as shown in Fig. 6, consists of the place of delivery of the fruit elevator 58. Insofar as the grader is concerned it is relatively immaterial what the source of the fruit, but inasmuch as the harvester is predicated on a particular use it must be borne in mind that the source of the pineapples is the plants in a field across which the harvester is transported.

After the pineapples are trimmed they are delivered to the grader 84 by way of the chute 85 (Fig. 6), along which grader the pineapples are shoved by the paddles 96 (Fig. 3) depending from the lower flight of the drive chain 94. The various sizes of pineapples drop through the slots 90 of the two grading troughs 87, 88, the largest pineapples being discharged at the open terminal 107. All of them eventually fall into the chute 102, 105, which is partitioned to keep the various sizes separate. The conveyor belt 110 moves all of the pineapples forwardly so as to place them within reach of the workmen's stations such as identified by the roller table 124 (Fig. 1).

From the table 124 the pineapples are placed in crates and carried away by a packing conveyor shown in section at the right in Fig. 1 and supported intermediate its ends by a laterally extending conveyor. This arrangement is fully illustrated and described in my copending application defined above.

I claim:

1. A grader comprising a pair of parallel fixed supports spaced laterally from each other, a series of troughs mounted on said supports and depending therebetween, said troughs being formed with upper marginal edge portions resting on said supports, said troughs being open-ended and in longitudinal alinement, the contiguous ends of the troughs being in substantial abutment with each other each trough having a slot extending longitudinally through the bottom thereof and dividing the trough into two sections of progressively varying widths for the separation of various sizes of articles delivered to the trough series, means depending below the troughs and secured to the sections for connecting the sections together, a drive chain having paddles to longitudinally traverse the trough series, said chain including upper and lower flights, sprockets mounted at the substantial terminals of the supports at a sufficient altitude to locate the lower flight of the chain substantially along the top of the trough series thus to properly position the respective paddles in respect to said series, and means to receive articles cropping through the slot openings and out of the open end of the final trough of the series when moved therealong by the paddles, said means consisting of a chute having partitions substantially matched in positions with the ends of the troughs.

2. A grader comprising a pair of fixed and laterally spaced angle irons, a series of longitudinally alined troughs removably supported by the angle irons, said troughs being formed of a pair of curved side walls having their lower edges spaced from each other to define slots, said slots being of progressively varying widths, laterally disposed flanges extending from the upper side edges of the side walls and resting on the angle irons, a yoke spanning each end of each trough and located below said ends, the ends of the yokes being secured to the lower portions of the side walls for maintaining the lower edges of said side walls in spaced relation, a chute underlying the trough series, being partitioned at the substantial joints between the troughs, and means for conveying fruit along the trough series to cause the fruit to drop through the slots according to sizes.

KERMIT J. JACKSON.